(12) United States Patent
Kim et al.

(10) Patent No.: US 11,668,634 B2
(45) Date of Patent: Jun. 6, 2023

(54) TEST APPARATUS FOR WINDOW DROP

(71) Applicant: Samsung Display Co., LTD., Yongin-si (KR)

(72) Inventors: Yu Ri Kim, Guri-si (KR); Hoi Kwan Lee, Suwon-si (KR); Min Ki Kim, Hwaseong-si (KR); Byeong-Beom Kim, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 278 days.

(21) Appl. No.: 17/098,555

(22) Filed: Nov. 16, 2020

(65) Prior Publication Data
US 2021/0302293 A1 Sep. 30, 2021

(30) Foreign Application Priority Data
Mar. 27, 2020 (KR) .......................... 10-2020-0037269

(51) Int. Cl.
*G01N 3/303* (2006.01)

(52) U.S. Cl.
CPC ....... *G01N 3/303* (2013.01); *G01N 2203/001* (2013.01); *G01N 2203/003* (2013.01); *G01N 2203/0064* (2013.01)

(58) Field of Classification Search
CPC ............. G01N 3/303; G01N 2203/001; G01N 2203/003; G01N 2203/0064; G01N 2203/006; G01N 3/30; G01M 7/08
See application file for complete search history.

(56) References Cited

U.S. PATENT DOCUMENTS

| | | | | |
|---|---|---|---|---|
| 5,390,535 A * | 2/1995 | Smock | ................... | G01N 33/42 73/79 |
| 6,374,661 B1 * | 4/2002 | Buratynski | .............. | G01N 3/30 73/12.06 |
| 6,508,103 B1 * | 1/2003 | Shim | ........................ | G01N 3/30 73/12.09 |
| 6,807,841 B1 * | 10/2004 | Chen | ....................... | G01N 3/303 73/12.06 |
| 6,892,564 B2 * | 5/2005 | Ishikawa | ................ | G01N 3/303 73/12.06 |
| 2004/0203446 A1 * | 10/2004 | Seung | ........................ | G01N 3/40 455/67.11 |
| 2005/0016256 A1 * | 1/2005 | Ishikawa | ................ | G01N 3/303 73/12.13 |
| 2015/0292998 A1 * | 10/2015 | Jeong | ...................... | G01N 3/303 73/12.13 |
| 2017/0176308 A1 * | 6/2017 | Koning | .................... | G01M 7/08 |
| 2019/0265141 A1 * | 8/2019 | Abram | ................... | G01N 3/303 |

FOREIGN PATENT DOCUMENTS

| | | |
|---|---|---|
| JP | 3994533 | 10/2007 |
| KR | 1020040006510 | 1/2004 |
| KR | 100964502 | 6/2010 |
| KR | 101136801 | 4/2012 |

OTHER PUBLICATIONS

Bin Zhang, et al., "A study of 3D cover glass design that improves handheld device drop reliability", Journal of the SID, (2017), p. 1-5.

* cited by examiner

*Primary Examiner* — Freddie Kirkland, III
(74) *Attorney, Agent, or Firm* — Cantor Colburn LLP

(57) ABSTRACT

A window drop test apparatus includes a support protruding in a first direction from the prop, and a guide portion that defines a drop space together with the support, where a drop test is performed through the drop space.

18 Claims, 17 Drawing Sheets

(A)      (B)      (C)

TEST APPARATUS FOR WINDOW DROP

This application claims priority to Korean Patent Application No. 10-2020-0037269 filed on Mar. 27, 2020, and all the benefits accruing therefrom under 35 U.S.C. § 119, the content of which in its entirety is herein incorporated by reference.

BACKGROUND

1. Field

Embodiments of the invention relate to a window drop test apparatus, and more particularly, relate to an apparatus for testing an impact characteristic of a window protecting a display portion in a portable device.

2. Description of the Related Art

A display device displays an image, and recently, a light emitting diode display has attracted attention, and a typical example is an organic light emitting diode display. In such a display device, a window protecting the display device is formed, and the window may be formed of a material having high transparency.

SUMMARY

When a user is directly carrying and using a device, such as a mobile phone, the device may be dropped during use due to various reasons such as user's carelessness, and in this case, a window thereof may be often broken like a glass.

Embodiments provide a window drop test apparatus manufactured to accurately apply impact to a predetermined position of a window.

In addition, a window drop test apparatus that may test a window by forming a window structure with additional weight added to the window and dropping the same so as to test a case where the window falls with the actual weight may be provided.

In addition, a window drop test apparatus that may make a test similar to a condition where a window falls to the actual road and the like may be provided.

A window drop test apparatus in an embodiment includes a support protruding in a first direction from the prop, and a guide portion that defines a drop space together with the support, where a drop test is performed through the drop space.

In an embodiment, an opening may be defined in the guide portion.

In an embodiment, the guide portion may include a first side portion, a first front portion, a second side portion, and a second front portion, the first front portion may be connected with the support by the first side portion, and the second front portion may be connected with the support by the second side portion.

In an embodiment, gradations may be provided in the second front portion to determine a height.

In an embodiment, a length of the first front portion and a length of the second front portion may be shorter than a height of the support such that the drop space is not defined in a predetermined area that is adjacent to the prop.

In an embodiment, at least one of a groove and a rail may be provided in the support, and the second side portion and the second front portion may be movable in a second direction perpendicular to the first direction along the at least one of groove and the rail provided in the support and change a width of the drop space.

In an embodiment, the window drop test apparatus may further include a fixing device that fixes the second side portion and the second front portion after the second side portion and the second front portion are moved.

In an embodiment, the support may include a first support and a second support, and the first support, the first side portion, and the first front portion may be fixed, and the second support, the second side portion, and the second front portion may be movable in a second direction perpendicular to the first direction and change a width of the drop space.

In an embodiment, the first side portion and the second side portion may be respectively provided in plural, and thus may further include additional openings that expose the drop space.

In an embodiment, a plurality of first and second side portions may have a structure in which a length is adjustable.

In an embodiment, the window drop test apparatus may further include a window structure that is inserted into the drop space and then dropped, where the window structure may include a window and a weight portion that is attached to one side of the window.

In an embodiment, the window may be a three-dimensional ("3D") window, and the 3D window may include a front surface having a flat surface and side surfaces that are bent toward a rear side at four sides of the front surface.

In an embodiment, a rear groove may be defined at the rear side of the 3D window, and the weight portion may be disposed inside the rear groove.

In an embodiment, the rear groove may be larger than the weight portion such that a gap is defined between a side surface of the side surfaces and the weight portion of the 3D window.

In an embodiment, the 3D window may have a constant thickness at the front surface and the side surfaces, and the constant thickness may range from about 500 micrometers ($\mu$m) to about 800 $\mu$m.

In an embodiment, the drop space may be larger than a cross-section of the window structure by about 1 millimeter (mm) to about 5 mm.

In an embodiment, the window drop test apparatus may further include a fixing device that is inserted into the drop space through the opening and supports the window structure.

In an embodiment, the fixing device may include a handle and an alignment table that is connected to a rear side of the handle and may have a flat upper surface.

In an embodiment, the fixing device may further include an angle provider that is attached to the alignment table and may provide angles to the window structure.

In an embodiment, the window drop test apparatus may further include sandpaper that is disposed in an upper surface of the prop.

According to the embodiments, the window may be dropped in various alignment states to apply an impact to a predetermined position, and thus an impact characteristic in a window at various positions may be confirmed.

In addition, the window structure with additional weight added to the window may be dropped and tested similar to a case where it falls with the actual weight.

In addition, it is possible to make a test corresponding to a case where the window falls to the actual road by roughly forming the surface where it will fall. As a result, the window may be tested with the impact actually applied when it falls.

BRIEF DESCRIPTION OF THE DRAWINGS

The above and other embodiments, advantages and features of this disclosure will become more apparent by describing in further detail embodiments thereof with reference to the accompanying drawings, in which.

DETAILED DESCRIPTION

Figure 1:
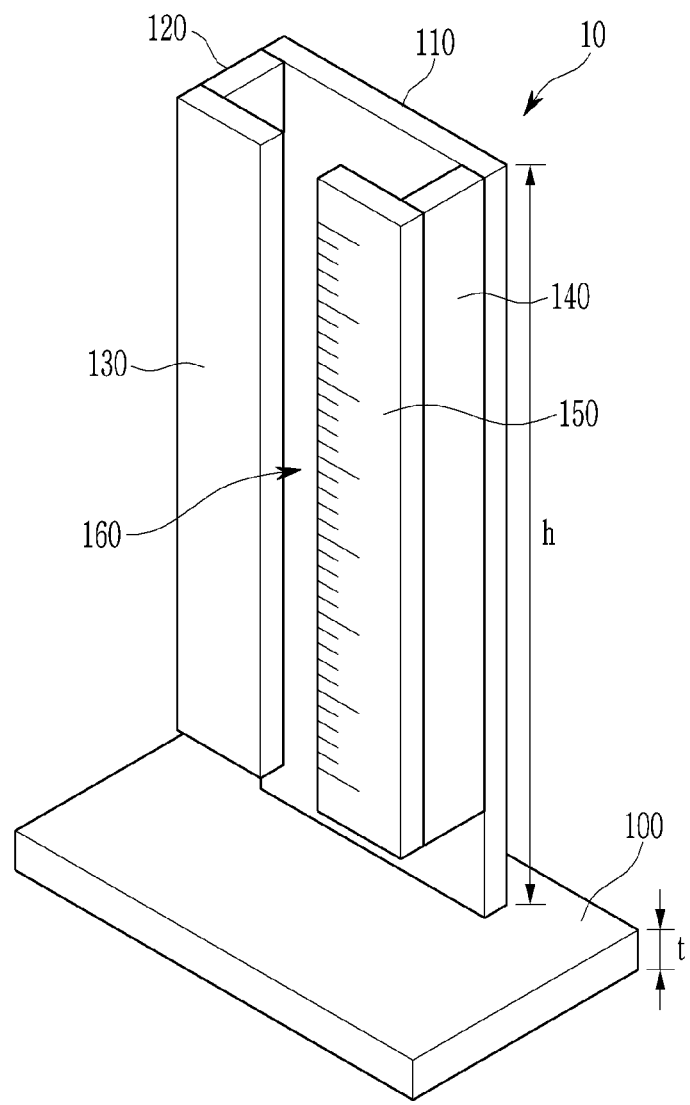
FIG. 1 is a perspective view of an embodiment of a window drop test apparatus.

Embodiments of the invention will be described more fully hereinafter with reference to the accompanying drawings, in which embodiments of the invention are shown. As those skilled in the art would realize, the described embodiments may be modified in various different ways, all without departing from the spirit or scope of the invention.

Accordingly, the drawings and description are to be regarded as illustrative in nature and not restrictive, and like reference numerals designate like elements throughout the specification.

Since the size and the thickness of each configuration shown in the drawings are arbitrarily indicated for better understanding and ease of description, the invention is not limited to shown drawings, and the thickness of layers, films, panels, regions, etc., are exaggerated for clarity. In the drawings, the thickness of layers, films, panels, regions, etc., are exaggerated for clarity. In the drawings, the thickness of some layers and regions is exaggerated for better understanding and ease of description.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, when an element is referred to as being "above" or "on" a reference element, it can be positioned above or below the reference element, and it does not necessarily mean being positioned "above" or "on" in a direction opposite to gravity.

In addition, unless explicitly described to the contrary, the word "comprise", and variations such as "comprises" or "comprising" will be understood to imply the inclusion of stated elements but not the exclusion of any other elements.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

Further, in the entire specification, the phrase "a plan view" means a view in which a target part is viewed from the top, and the phrase "a cross-section" means a case in which a cross-section of the target part that is cut in a vertical direction is viewed from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Hereinafter, a window drop test apparatus in an embodiment will be described with reference to FIGS. 1 and 2.

Figure 2:
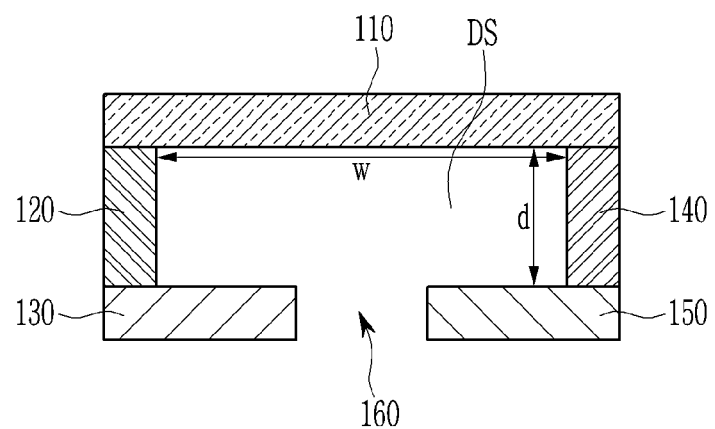
FIG. 2 is a horizontal cross-sectional view of the window drop test apparatus of FIG. 1.

FIG. 1 is a perspective view of an embodiment of a window drop test apparatus, and FIG. 2 is a horizontal cross-sectional view of the window drop test apparatus of FIG. 1.

A window drop test apparatus 10 is an apparatus for testing an impact characteristic of a window provided in a front side to protect a display portion in a portable device such as a mobile phone and the like.

The window drop test apparatus 10 of the illustrated embodiment has a characteristic that a drop space in which a window is guided when being dropped is defined, and includes a prop 100, a support 110, and a guide portion that defines a drop space together with the support 110.

The window drop test apparatus 10 in the embodiment of FIGS. 1 and 2 includes the prop 100, the support 110, a first side portion 120, a first front portion 130, a second side portion 140, and a second front portion 150. Here, the first side portion 120, the first front portion 130, the second side portion 140, and the second front portion 150 may define the drop space with the support 110, and thus will be also referred to as a guide portion hereinafter. Referring to FIG. 1, an opening 160 is defined in the guide portion.

The details of each part of the window drop test apparatus 10 are as follows.

The prop 100 is a portion that supports the whole window drop test apparatus 10, and when the test is carried out, the window falls to the upper surface of the prop 100 (hereinafter also referred to as an impact side). The entire or at least the upper surface of the prop 100 may include a metallic material such as stainless steel. When the upper surface is metal, the impact on the window is strong compared to wood or plastic, and thus the impact characteristic of the window may be easily checked. In an embodiment, the prop 100 may have a thickness t equal to or greater than about 10 millimeter (mm) and equal to or less than about 50 mm, for example, and the prop 100 may be provided with the thickness t and a material sufficient to support the support 110, the first side portion 120, the first front portion 130, the second side portion 140, and the second front portion 150.

The support 110 extends in the vertical direction from the prop 100, and is arranged such that a wide surface faces the front. A bottom surface of the support 110 is fixed to a part of the upper surface of the prop 100 such that the support 110 may stand in the vertical direction without falling to one side. In addition, the support 110 may include a material capable of supporting the first side portion 120, the first front portion 130, the second side portion 140, and the second front portion 150, and there are no restrictions on materials such as stainless steel or wood.

In an embodiment, the support 110 may have a height h equal to or greater than about 150 centimeter (cm), for example, and it is preferable that the height h of the support 110 is increased because the test height for window drop may be increased as the height h of the support 110 is increased. However, in the case of an actual mobile phone, the height that the mobile phone falls is mainly between the height of the thigh of a person and the height of the eye, and thus it is considered that many tests at the height of around about 1 meter (m) are desired. Thus, the support 110 in the embodiment has a height of about 150 cm, for example.

The first side portion 120 and the second side portion 140 are fixed to protrude toward the front side from the support 110. The first side portion 120 and the second side portion 140 are attached to the support 110 such that wide sides of the first and second side portions 120 and 140 face the side. In the illustrated embodiment, one side of the first side portion 120 and the left side of the support 110 match each other, one side of the second side portion 140 and the right side of the support 110 match each other, and top sides of the support 110, the first side portion 120, and the second side portion 140 match each other. In addition, the first side portion 120 and the second side portion 140 have the same size and shape as each other, and thus the lengths protruded from the support 110 are the same. Accordingly, the support 110, the first side portion 120, and the second side portion 140 may be horizontally symmetrical with reference to a central plane.

The first front portion 130 is attached to the first side portion 120 in the vertical direction such that a wide plane of the first front portion 130 faces frontward. A top side of the first side portion 120 and a top side of the first front portion 130 match each other.

The second front portion 150 is attached to the second side portion 140 in the vertical direction such that a wide plane of the second front portion 150 faces frontward.

A top side of the second side portion 140 and a top side of the second front portion 150 match each other. In addition, a scale is provided on the second front portion 150 to measure the height of the corresponding position.

The first front portion 130 and the second front portion 150 also have the same size and shape as each other, and thus the left-side structure (the first side portion 120 and the first front portion 130) and the right-side structure (the second side portion 140 and the second front portion 150) with reference to the support 110 are horizontally symmetrical with each other with reference to the central planes thereof.

The first side portion 120, the second side portion 140, the first front portion 130, and the second front portion 150 have the same height, which is the same as the height of the support 110. However, the first side portion 120, the second side portion 140, the first front portion 130, and the second front portion 150 are not provided in a portion where the prop 100 is provided in the support 110. That is, a height of the first side portion 120, a height of the second side portion 140, a height of the first front portion 130, and a height of the second front portion 150 are less than a height of the support 110 such that a drop space is not defined in a predetermined area (e.g., lower area) adjacent to the prop 100. The portion where the drop space is not defined may imply a height at which the window is not dropped, and the window drop test may be carried out from a height where the first side portion 120, the second side portion 140, the first front portion 130, and the second front portion 150 are positioned. When the height for the window drop test is about 20 cm, for example, the length of each of the first side portion 120, the second side portion 140, the first front portion 130, and the second front portion 150 is set to about 130 cm such that the window drop test may be carried out with the height equal to or greater than about 20 cm and equal to or less than about 150 cm, for example.

A sum of a width of the front side of first front portion 130 and a width of a front side of the second front portion 150 is smaller than a width of a front side of the support 110 along the horizontal direction, and thus the opening 160 is defined between the first front portion 130 and the second front portion 150. The opening 160 is a portion for entering the drop space, and is used to set the window to have a predetermined height and angle.

Referring to FIG. 2, the drop space DS defined by the support 110, the first side portion 120, the first front portion 130, the second side portion 140, and the second front portion 150 may be determined. Here, a guide portion includes the first side portion 120, the first front portion 130, the second side portion 140, and the second front portion 150, and thus the drop space DS may be defined by the support 110 and the guide portion.

The drop space DS is a path through which the window falls when dropped, while guiding the window from rotating or falling in other directions. The drop space DS is slightly wider than a cross-section of the window. In the illustrated embodiment, a length d of the first side portion 120 and the second side portion 140 is about 10 mm, for example, and it corresponds to a length d (hereinafter also referred to as a depth d) of the drop space DS. The length d of the first side portion 120 and the second side portion 140 may vary depending on embodiments, and is set to be greater than a length of the cross-section of the window to be dropped by about 1 mm to about 5 mm to guide the window to fall while avoiding friction. In addition, a distance between the first side portion 120 and the second side portion 140 defines a width w of the drop space DS, and the width w is also greater than the thickness of the falling window by at least about 1 mm to guide the window to drop without experiencing friction. The width w may be changed while being arranged at various angles, and may be greater than the widest width of the window to be dropped by at least about 1 mm. However, depending on embodiments, the depth d and the width w of the drop space DS may be set to be variable such that widows of various sizes may be dropped.

Hereinabove, window drop is described, but actually, objects other than the window may be dropped. That is, in a case that only the window falls and in a case that an actual mobile phone falls, there is a difference in weight, and thus the impact received by the window is different even when it falls from the same height. Therefore, the window structure corresponds to the weight of the actual mobile phone, and the entire window structure may be dropped and tested rather than testing drops of the window only. Hereinafter, a window structure that may be used in the test will be described with reference to FIGS. 3(A), 3(B) and 3(C).

FIGS. 3(A), 3(B) and 3(C) show a window structure used in the window drop test apparatus, where (A) shows a front and a cross-section of a three-dimensional ("3D") window 210, (B) shows a weight portion 220 attached to the rear side of the window, and (C) shows a front and a cross-section of the window structure in which the 3D window 210 and the weight portion 220 are combined. Here, the weight portion 220 is shown to be separated by adding a checkered pattern.

First, referring to FIG. 3(A), the 3D window 210 has a flat front side, and four sides are bent toward the rear side. Accordingly, a center portion of the 3D window 210 is recessed from the rear side, and this will be also referred to as a rear groove. In an embodiment, the thickness of the 3D window 210 may be constant on the front and side surfaces, and the thickness may range from about 500 micrometers (μm) to about 800 μm, for example.

Figure 3:
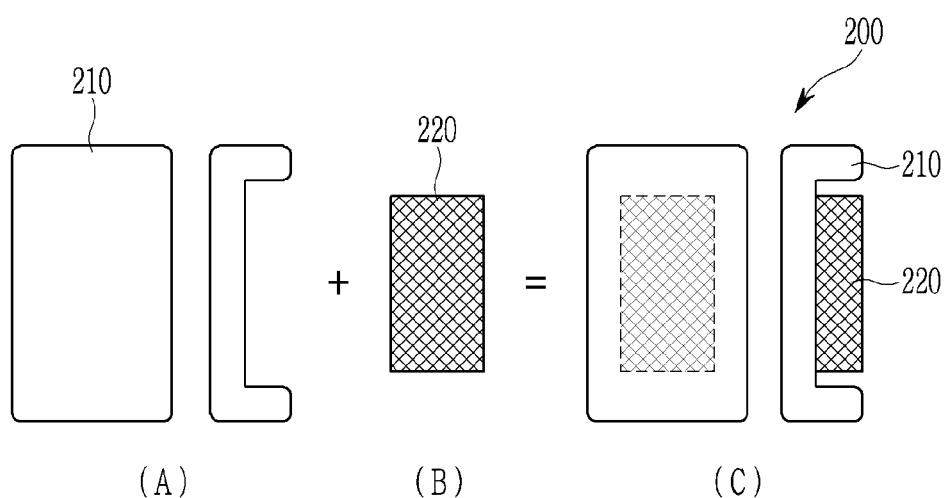
FIGS. 3(A), 3(B) and 3(C) shows a window structure used in the window drop test apparatus.

Referring to FIG. 3 (C), the weight portion 220 is attached to the rear groove of the 3D window 210 to form the window structure 200. In an embodiment, the weight portion 220 may have a weight that corresponds to a weight of a mobile phone where the 3D window 210 is actually used, and the weight of the weight portion 220 may be equal to or greater than 50 grams (g) and equal to or less than 300 g, for example. In an embodiment, the weight portion 220 may include a metal material such as iron and an aluminum alloy, for example.

Referring to FIG. 3 (C), it is illustrated that a size of the rear groove of the 3D window 210 is larger than a size of the weight portion 220 in the window structure 200. Thus, a constant gap is defined between side surfaces of the 3D window 210 and the weight portion 220. However, depending on embodiments, the weight portion 220 may fully fill the rear groove of the 3D window 210. Where there is no gap between the weight portion 220 and the side surfaces of the 3D window 210, an impact applied to the 3D window 210 may be shared with the weight portion 220 such that the 3D window 210 is not broken. Therefore, when there is a gap between the weight portion 220 and the side surface of the 3D window 210 in the window structure 200, there is a merit that the impact characteristic of the side surface of the 3D window 210 may be more accurately checked.

The drop test may be carried out by dropping such a window structure 200 from a predetermined height in the drop space.

In this case, the height of the window structure 200 may be fixed by a finger in the opening 160, but depending on embodiments, a separate fixing device 170 (refer to FIG. 4) may be used.

Hereinafter, the fixing device 170 will be described with reference to FIGS. 4 to 6.

Figure 4:
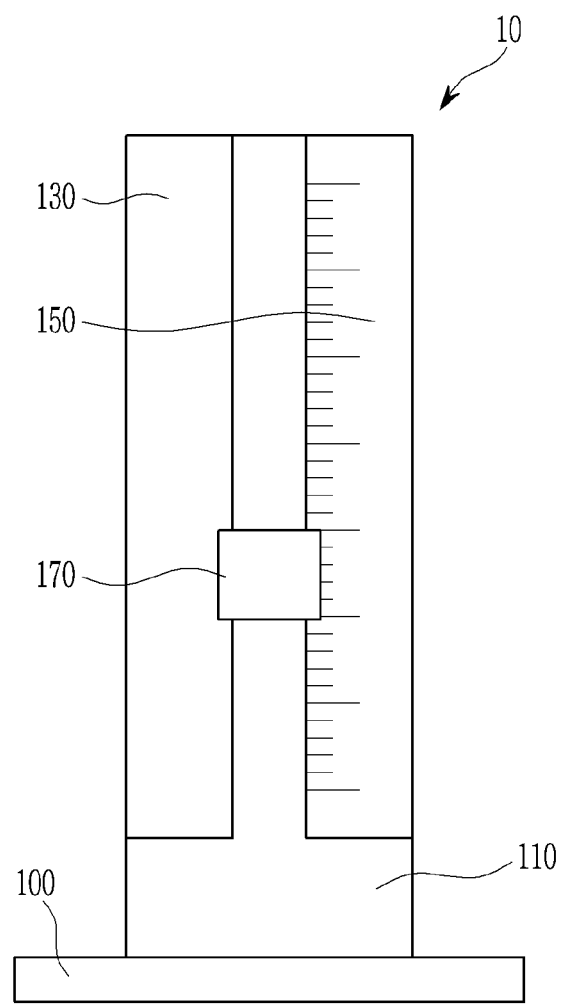
FIG. 4 is a front view of an embodiment of the window drop test apparatus.
Figure 5:
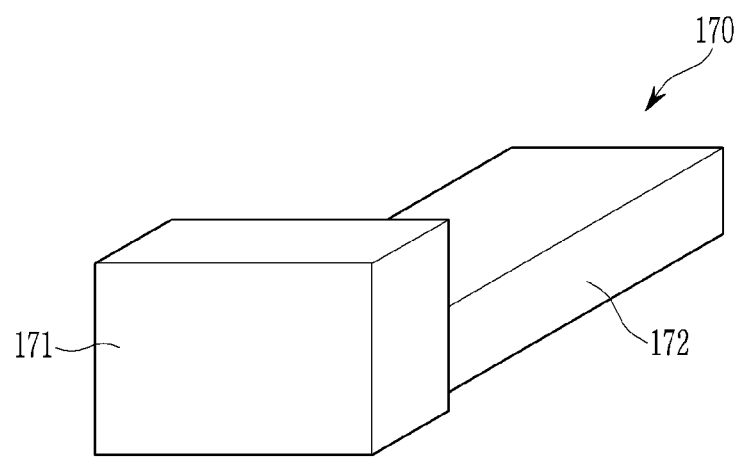
FIGS. 5 and 6 are perspective views of an embodiment of a fixing device of a window structure.
Figure 6:
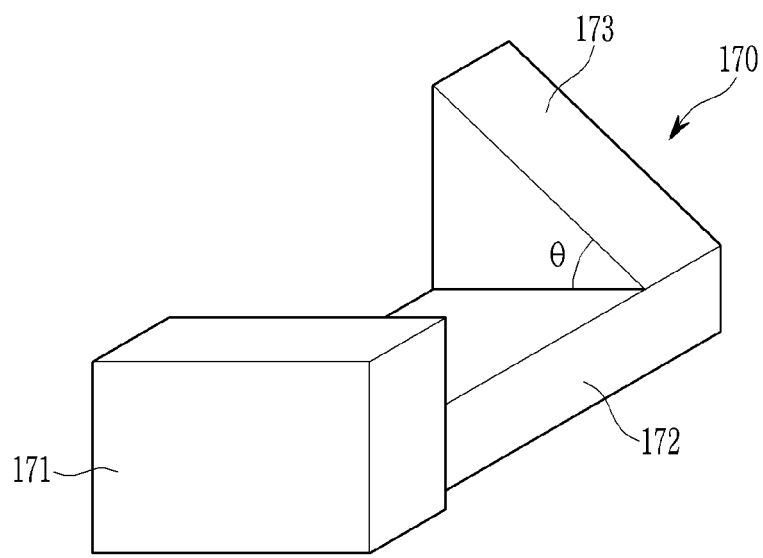

FIG. 4 is a front view of an embodiment of the window drop test apparatus, and FIGS. 5 and 6 are perspective views of an embodiment of the fixing device of the window structure.

FIG. 4 is a front view of a case in which the fixing device 170 is inserted into the opening 160, and the height of the window structure 200 may be adjusted by adjusting the height of the fixing device 170.

The fixing device 170 may have various structures depending on embodiments, but will be described with an embodiment of FIG. 5 and an embodiment of FIG. 6.

First, the fixing device 170 of FIG. 5 will be described.

The fixing device 170 of FIG. 5 includes a handle 171 and an alignment table 172. The handle 171 has a structure that may be held by a user's hand, and may have a shape that is different from the rectangular parallelepiped structure shown in FIG. 5. The alignment table 172 is connected to a rear surface of the handle 171, and has a rectangular parallelepiped structure. The alignment table 172 has a flat top surface, and thus the window structure 200 may be horizontally aligned when being disposed on the top surface of the alignment table 172. Accordingly, when the fixing device 170 is removed, the side surfaces of the window structure 200 drop and collide with the prop 100.

Depending on embodiments, the window structure 200 may be aligned at a predetermined angle rather than being horizontally aligned, and the fixing device 170 used in this case is illustrated in FIG. 6.

The fixing device 170 illustrated in FIG. 6 further includes an angle provider 173 in the fixing device 170 of FIG. 5. The angle provider 173 is provided in a portion where the window structure 200 is disposed in the alignment table 172, and in the embodiment of FIG. 6, the angle provider 173 is disposed at the end of the alignment table 172.

The angle provider 173 has a triangular pillar structure, and has an upper surface defining a predetermined angle θ with respect to the upper surface of the alignment table 172. When the window structure 200 is disposed on the upper surface of the angle provider 173, the window structure 200 is aligned at the predetermined angle θ such that a predetermined corner of the window structure 200 collides with the prop 100 first when being dropped.

Depending on embodiments, the angle provider 173 is provided in plural for various angles θ, and thus when a desired angle is determined, an angle provider 173 having the corresponding angle may be attached to the alignment table 172 and used. In addition, depending on embodiments, the angle provided by the angle provider 173 may be changed. In an embodiment, the angle θ may be equal to or greater than about 1 degree and equal to or less than about 90 degrees, for example.

In addition, in FIG. 6, it is illustrated that the angle provider 173 provides an angle in the clockwise direction or counterclockwise direction with reference to the upper surface of the alignment table 172 when the window structure 200 is viewed from the front, but depending on embodiments, the angle may be provided with reference to the support 110. That is, the angle provider 173 may be provided such that the window structure 200 is aligned to have an angle in the direction toward the support 110 or away from the support 110 (refer to FIG. 9B).

Hereinafter, the alignment and dropping of the window structure in the window drop test apparatus 10 will be described with reference to FIGS. 7 and 8.

Figure 7:
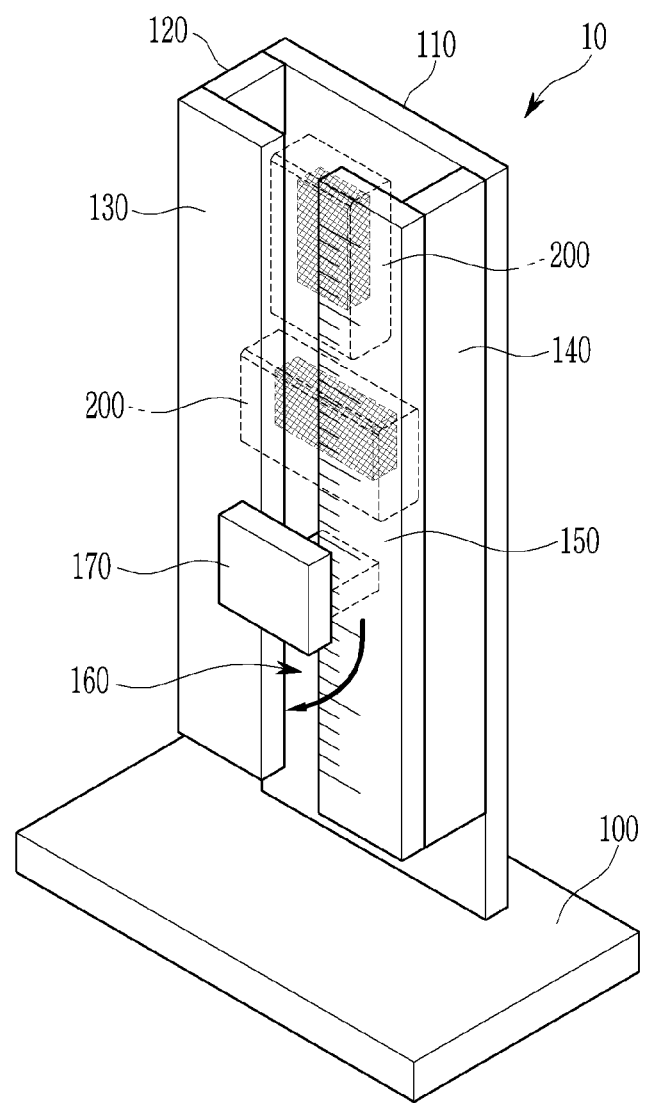
FIGS. 7 and 8 show an embodiment of a method for dropping a window structure in the window drop test apparatus.
Figure 8:
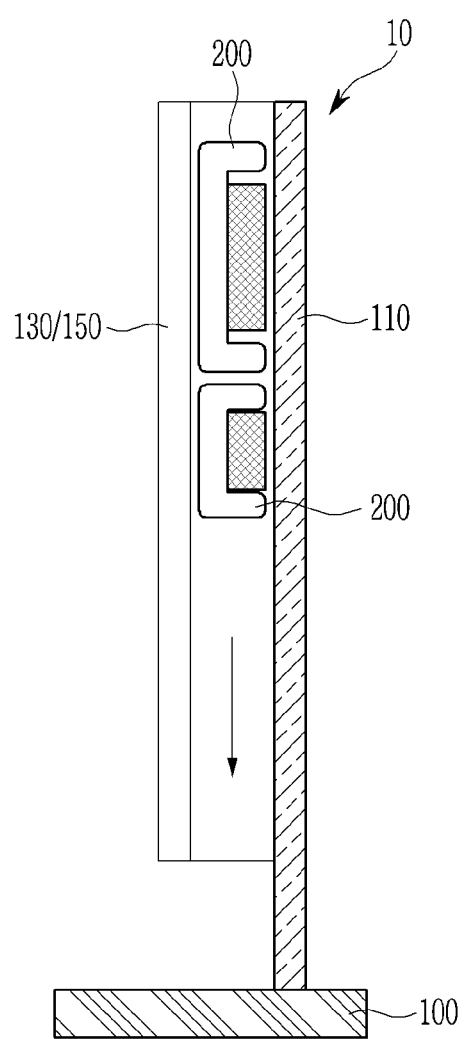

FIGS. 7 and 8 show an embodiment of a method for dropping the window structure in the window drop test apparatus.

In FIGS. 7 and 8, two window structures 200 are illustrated in each drawing for describing two alignment states, however, in the actual test, one window structure 200 is dropped for the test.

First, in FIG. 7, a state in which the window structure 200 is aligned by the fixing device 170 of FIG. 5 is illustrated.

The window structure 200 is provided in the drop space and then aligned by the fixing device 170 such that the window structure 200 is positioned at a predetermined height. The fixing device 170 of FIG. 5 may horizontally or vertically align the window structure 200, and the two cases are illustrated in FIG. 7.

In this case, the height of the fixing device 170 may be determined through graduations provided in a second front portion 150, and thus a height at which the window structure 200 will fall may be determined.

Next, when the fixing device 170 is removed, as shown in FIG. 8, the window structure 200 falls along the drop space. In this case, the fixing device 170 may be pulled out in a horizontal direction toward the front, and depending on embodiments, the fixing device 170 may be removed by rotating the handle 171 of the fixing device 170 downward (refer to the arrow in FIG. 7). When the fixing device 170 is removed in the horizontal direction, torque may be generated by frictional force between window structure 200 and fixing device 170, and thus, in FIG. 7, the handle 171 of the fixing device 170 is rotated downward. However, even in the case of removing the fixing device 170 in the horizontal direction, the drop space is guided in the illustrated embodiment and thus there is a merit in which a portion collided with the prop 100 does not significantly change.

In the embodiment of FIGS. 7 and 8, one side surface of the window structure 200 collides with the prop 100.

However, when the window structure 200 is aligned by providing an angle, the window structure 200 may collide with the prop 100 at various angles, and this will be described with reference to FIGS. 9A and 9B.

Figure 9A:
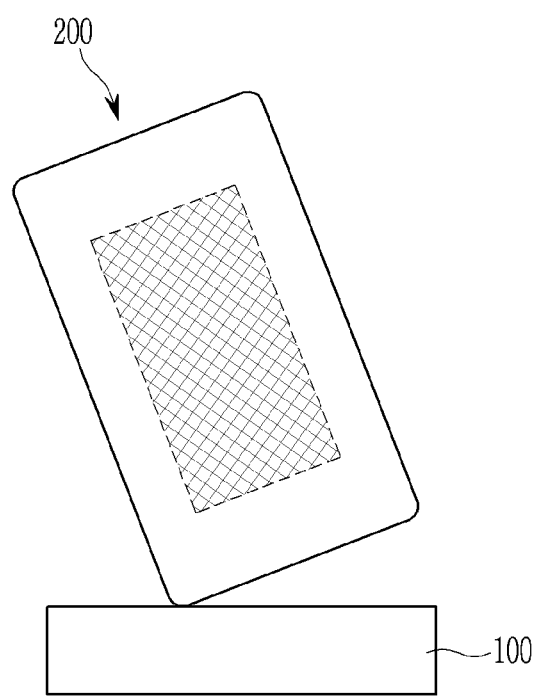
FIGS. 9A and 9B illustrate examples of portions where the window structure dropped in an embodiment of the window drop test apparatus collides with the prop.
Figure 9B:
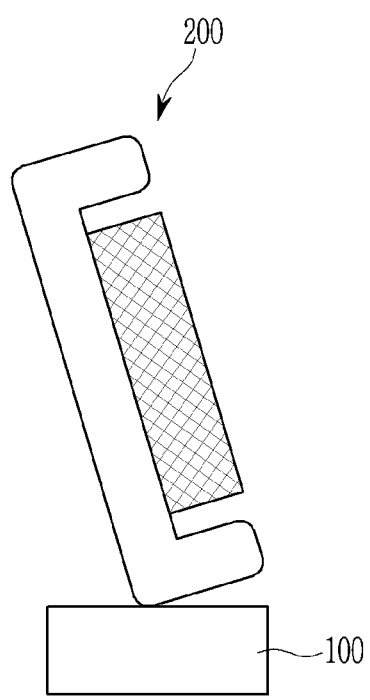

FIGS. 9A and 9B illustrate examples of portions where the window structure dropped in an embodiment of the window drop test apparatus collides with the prop.

In FIG. 9A illustrates a case that, when the fixing device 170 of FIG. 6 is used, a corner at which the front surface and two side surfaces meet collides with the prop 100 first as the window structure 200 drops at an angle aligned by the angle provider 173. In this case, the window structure 200 was horizontally aligned with respect to the support 110.

However, the window structure 200 may be aligned to have an angle with respect to the support 110, and this is illustrated in FIG. 9B.

In FIG. 9B, the window structure 200 has an angle with the support 110, and thus the window structure collides with the prop 100 at one side where the front side and one side surface of the window structure meet.

As described, the window drop test apparatus 10 in the illustrated embodiment may arrange various surfaces of the 3D window 210 to collide with the prop 100, so there is a merit capable of performing various drop tests.

A method for performing the drop test using the window drop test apparatus 10 in the illustrated embodiment may be briefly described as follows.

When it is determined which part of the strength is to be checked in the 3D window 210, an angle at which an impact may be applied to the corresponding part is determined.

Next, the window structure 200 is aligned with the corresponding angle at the lowest height (e.g., 20 cm in the illustrated embodiment), and then dropped.

Then, a result is collected by at least five 3D windows 210 while increasing the height sequentially. The test may be performed while increasing the height at regular intervals ranging from about 1 cm to about 10 cm based on the characteristic of the window. In addition, the drop test may be performed for every narrow gap when it is targeted for corners that may be easily broken, and when a flat side is targeted for the drop test, the drop test may be performed at large intervals.

Here, the height at which the 3D window 210 is broken may be defined as the drop strength.

Hereinabove, the embodiment in which the window structure 200 collides with the prop 100 has been described. When the prop 100 includes a metallic material such as stainless steel, the prop 100 has a smooth surface which is a different from an irregular surface of a prop 100 where a mobile phone is actually dropped.

In order to remove such a difference, depending on embodiments, sandpaper 180 including a rough surface may be attached to the top surface of the prop 100, and this will be described with reference to FIG. 10.

Figure 10:
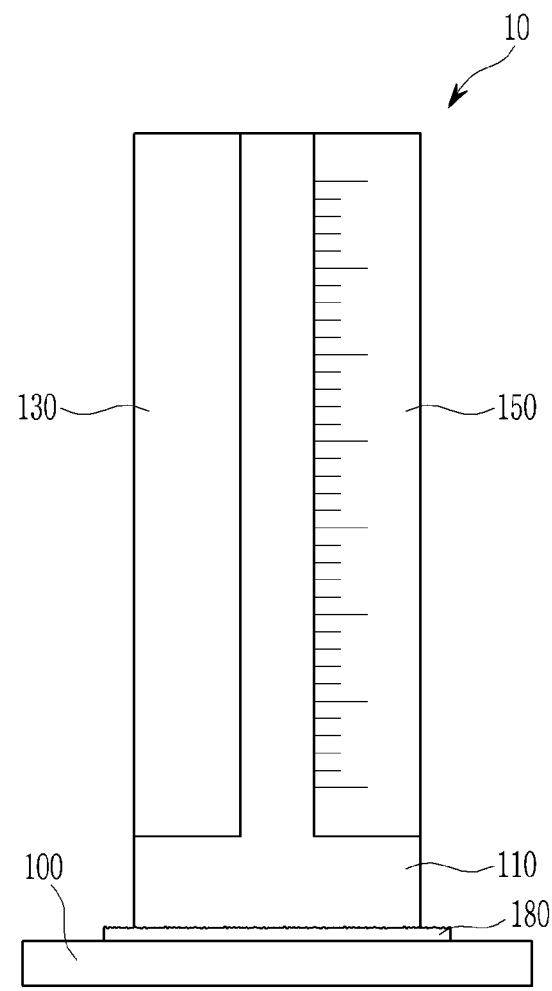
FIG. 10 is a front view of another embodiment of a window drop test apparatus 10.

FIG. 10 is a front view of another embodiment of a window drop test apparatus 10.

Unlike the window drop test apparatus in the embodiment of FIG. 1, a window drop test apparatus in an embodiment of FIG. 10 further includes the sandpaper 180 on a top surface of the prop 100.

The sandpaper 180 is provided by fixing grains such as sand grains and glass powder on paper or cloth, and the characteristics of the sandpaper 180 change depending on the size of the grains.

To test the dropping of a 3D window 210 on an uneven or pointed surface, it may be appropriate to use the sandpaper 180 with a grain size greater than a predetermined level. A case of attaching the sandpaper 180 corresponds to an extreme collision environments compared to a case of using only the prop 100, and when a test for more extreme environments is desired, the window structure 200 may be dropped on the sandpaper 180 in a more severe condition (e.g., with a speed faster than a free drop speed).

The sandpaper 180 is just an example, and a material including a rough surface may provide the same effect as using the sandpaper 180.

Hereinabove, a structure in which the first side portion 120 and the second side portion 140 are continuously provided has been described. Hereinafter, a structure including a plurality of side portions will be described with reference to FIG. 11.

Figure 11:
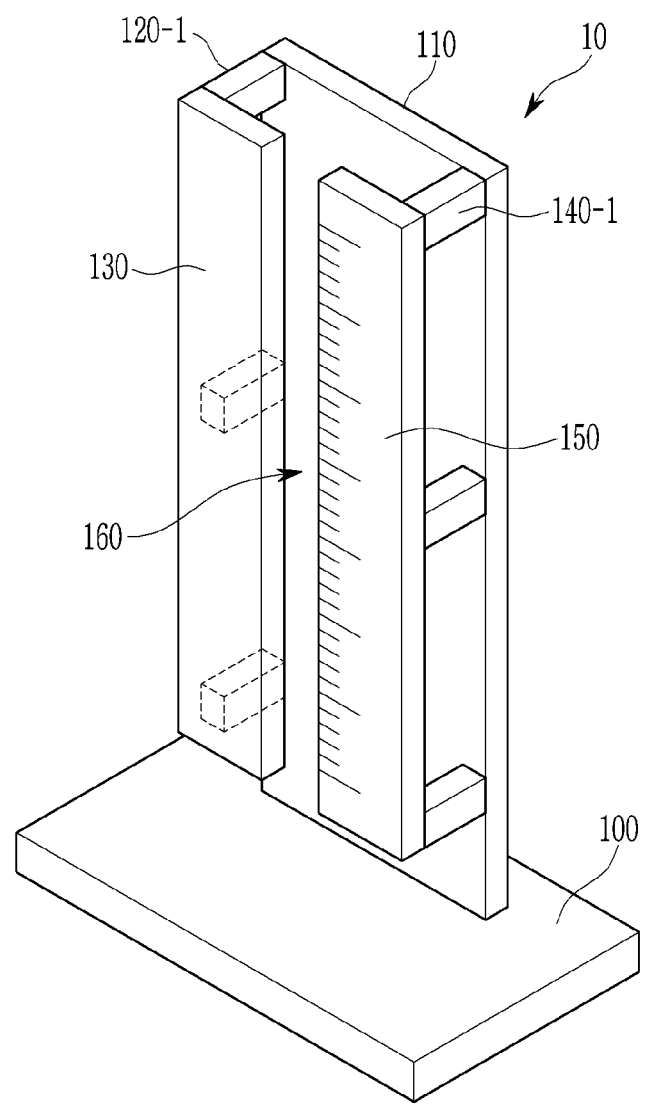
FIG. 11 is a perspective view of another embodiment of a window drop test apparatus.

FIG. 11 is a perspective view of another embodiment of a window drop test apparatus.

Unlike as in FIG. 1, in FIG. 11, a plurality of first side portions 120-1 and a plurality of second side portions 140-1 are provided. That is, a support 110 and a first front portion 130 are connected by the plurality of first side portions 120-1, and the support 110 and a second front portion 150 are connected by the plurality of second side portions 140-1.

In the structure of FIG. 11, openings are additionally defined between the plurality of first side portions 120-1 and between the plurality of second side portions 140-1 such that a drop space is more exposed to the outside. Thus, entrances to the drop space are provided at opposite sides, and a window structure 200 may be inserted into the drop space therethrough, or initial alignment of the window structure 200 may be carried out from a side. In FIG. 11, a fixing device 170 may be inserted from a side surface and then used. Therefore, when the drop space is opened as shown in FIG. 11, insertion and alignment of the window structure 200 may be easily performed.

In FIG. 11, three first side portions 120-1 and three second side portions 140-1 are respectively provided, but depending on embodiments, only two of first side portions 120-1 and two of second side portions 140-1 may be respectively provided by removing the first side portion 120-1 and the second side portion 140-1 that are disposed at the center, to thereby further open the drop space.

Hereinabove, the embodiment in which the size of the drop space is fixed has been described. However, depending on embodiments, the drop space may be varied for various window structure 200 drop tests, and this will now be described with reference to FIGS. 12 to 15.

FIGS. 12 to 15 are perspective views of window drop test apparatuses according to other embodiments.

First, an embodiment of FIG. 12 will be described.

Figure 12:
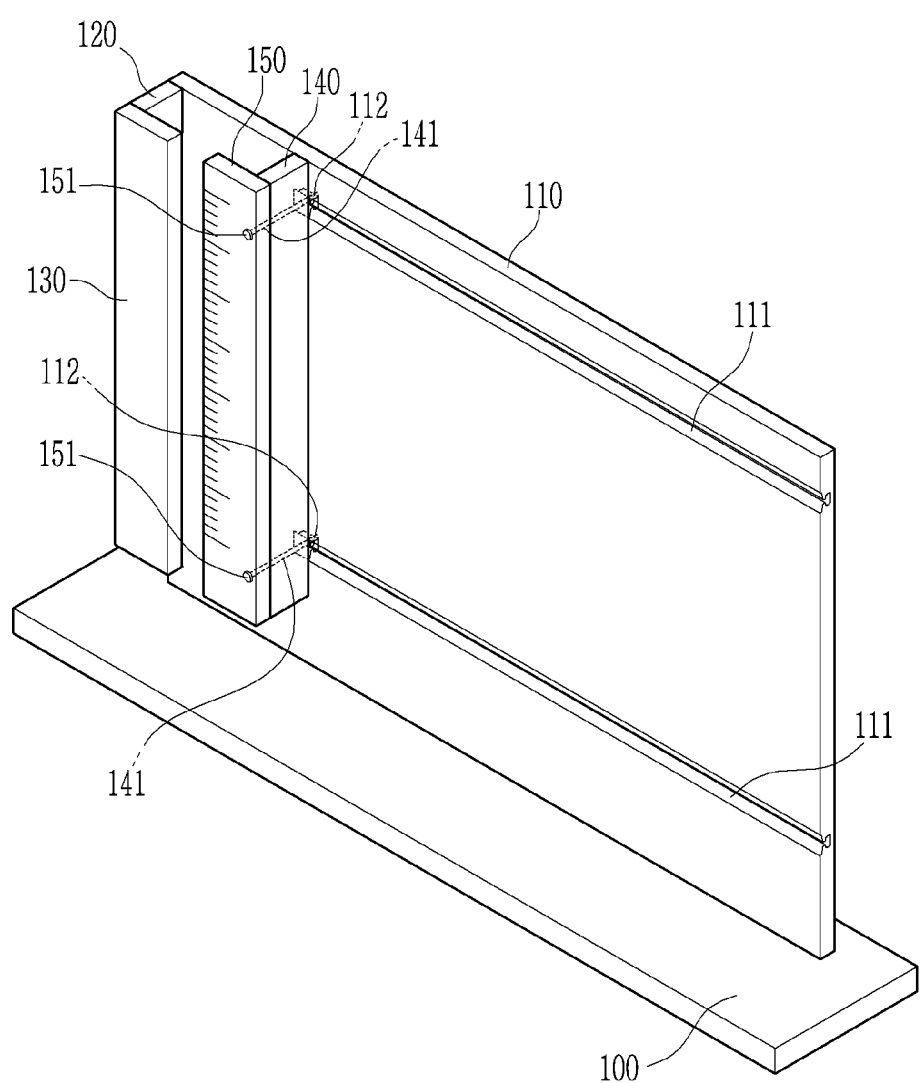
FIGS. 12 to 15 are perspective views of other embodiments of window drop test apparatuses.

In FIG. 12, a second side portion 140 and a second front portion 150 move along a groove 111 defined in a support 110 such that a width w (refer to FIG. 2) of a drop space is changed.

The second side portion 140 further includes a protrusion structure that corresponds to the groove 111 such that the second side portion 140 may move along the groove 111.

In the embodiment of FIG. 12, when the second side portion 140 and the second front portion 150 moving along the groove 111 need to be fixed at a desired position, they are fixed by fixing devices 151 and 112. Here, a first fixing device 151 includes a protruded thread (male thread) and a recessed thread (female thread) is defined in the second fixing device 112, and thus the second side portion 140 and the second front portion 150 are fixed to the support 110 as the second fixing device 112 rotates.

Holes 141 corresponding to the first fixing devices 151 are further defined in the second side portion 140 and the second front portion 150 such that the first fixing devices 151 may be inserted in the second fixing device 112.

In the embodiment of FIG. 12, two grooves 111 are defined, but the number of grooves 111 may be changed.

Hereinafter, an embodiment of FIG. 13 will be described.

Figure 13:
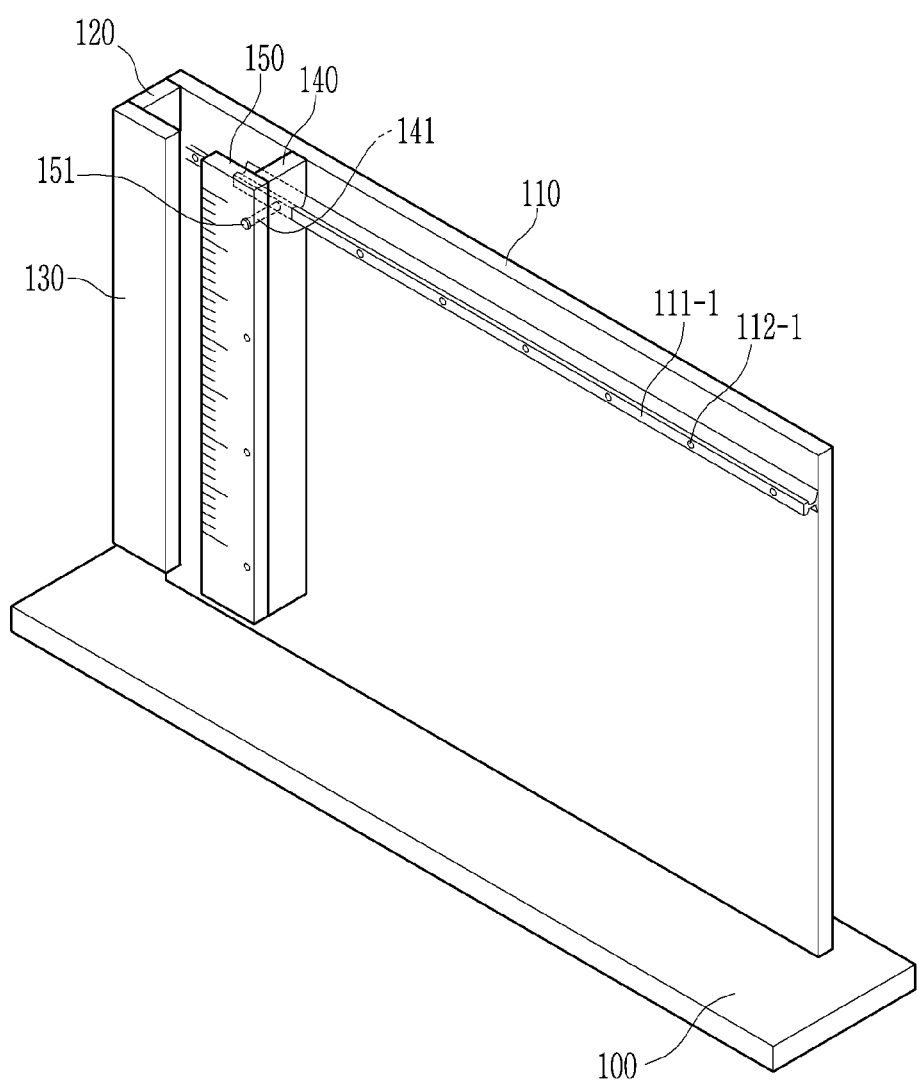

Unlike the embodiment of FIG. 12, in the embodiment of FIG. 13, a rail 111-1 is protruded from a support 110, and a second side portion 140 and a second front portion 150 move along the rail 111-1.

A groove corresponding to the rail 111-1 is defined in the second side portion 140 so that the second side portion 140 may move along the rail 111-1.

A hole 141 is defined in the second side portion 140 and the second front portion 150 so that a first fixing device 151 may be inserted into a second fixing device 112-1.

In the embodiment of FIG. 13, the second fixing device 112-1 is provided in plural while having a regular interval on the rail 111-1, and a female thread is defined therein. Thus, the second side portion 140 and the second front portion 150 stop at positions where the second fixing devices 112-1 are provided while moving, and are fixed to the second fixing device 112-1 by rotating the first fixing device 151.

In the embodiment of FIG. 13, only one rail 111-1 is illustrated, and this is because, since the rail 111-1 has a protruded structure and thus a drop space is reduced, the number of rails 111-1 is reduced to the minimum, thereby preventing the drop space from being affected.

Hereinafter, an embodiment of FIG. 14 will be described.

Figure 14:
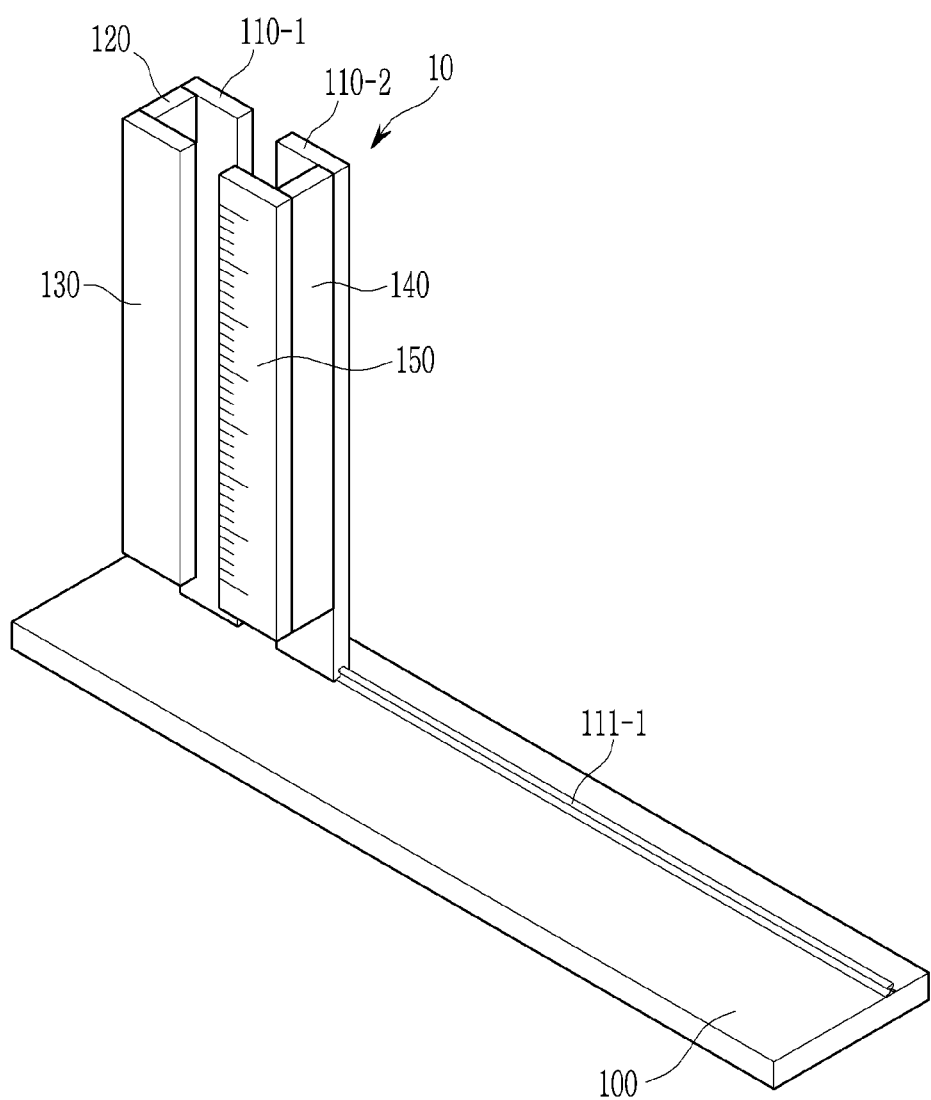

In an embodiment of FIG. 14, a support is divided into two supports 110-1 and 110-2, and the first support 110-1, a first side portion 120, and a first front portion 130 are fixed, and the second support 110-2, a second side portion 140, and a second front portion 150 are movable.

In addition, a rail 111-1 is provided in a prop 100, and a groove corresponding to the rail 111-1 is defined in a bottom side of the second support 110-2.

In FIG. 14, an additional fixing means is not illustrated, but depending on embodiments, an additional fixing means prevents the second support 110-2 from moving.

In the embodiments of FIGS. 12 to 14, a width w (refer to FIG. 2) of the drop space is preferably changeable as much as possible, and in the case of a mobile phone, the width w of the drop space may be adjustable in a range from about 5 cm to about 20 cm.

Hereinafter, an embodiment in which a depth d of a drop space is changed will be described with reference to FIG. 15.

Figure 15:
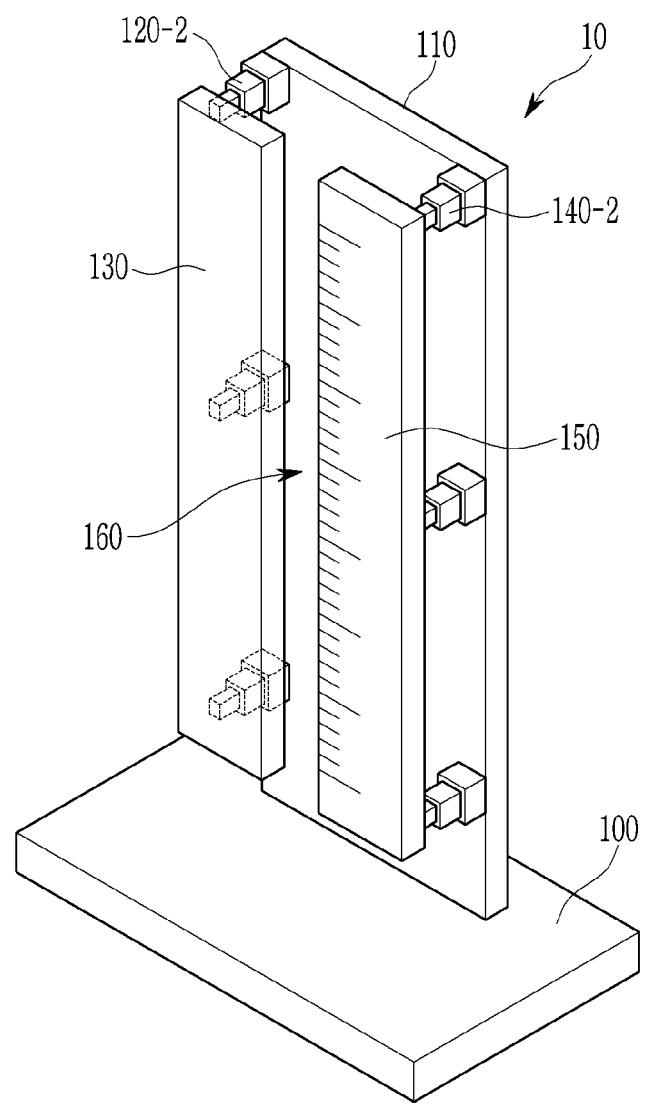

As in the embodiment of FIG. 11, in FIG. 15, a plurality of side portions are provided, but unlike the embodiment of FIG. 11, variable side portions 120-2 and 140-2 may change a depth d (refer to FIG. 2) of a drop space.

In FIG. 15, a first variable side portion 120-2 and a second variable side portion 140-2 have lengths that may be adjusted like a length of a tripod, and thus the depth d of the drop space is changed. Considering that a mobile terminal is not thick, the depth d of the drop space is less likely to be significantly changed, but may need to be adjusted in the case of dropping obliquely with respect to a support 110 (refer to FIG. 9B). Accordingly, the window structure 200 may be tilted at various angles with reference to the support 110 and dropped.

Hereinabove, a window used as the window structure 200 has been described as the 3D window 210. However, other structures of the window may also be used during the drop test, and this will be described with reference to FIG. 16.

Figure 16A:
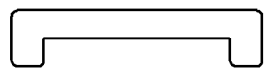
FIGS. 16A, 16B and 16C are cross-sectional views of embodiments of a window that may be used in a window drop test apparatus.
Figure 16B:
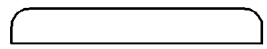
Figure 16C:
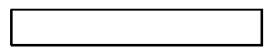

FIGS. 16A to 16C are cross-sectional views of embodiments of a window that may be used in a window drop test apparatus.

In FIG. 16A illustrates a cross-section of a 3D window, FIG. 16B illustrates a cross-section of a two-and-a-half-dimensional ("2.5D") window, and FIG. 16C illustrates a cross-section of a two-dimensional ("2D") window.

The 2D window has a general glass plate structure with right-angled corners of an upper surface, and the 2.5D window has a glass plate structure with rounded corners of an upper surface. The 3D window has a structure that is bent toward the back, and thus may be easily broken by impact on the side. Due to the structural characteristics of the 3D window, it is necessary to test the impact of the 3D windows in various positions. The impact tests may be performed from various angles of the 3D window by the window drop test apparatus in the embodiment.

However, in addition to the 3D window, the 2D window and the 2.5D window may also be used in the window drop test apparatus for performing the test. In this case, a weight portion 220 is attached to the rear side as shown in FIG. 3 and then the test may be performed.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the inventive concept.

What is claimed is:

1. A window drop test apparatus comprising:
a prop;
a support protruding in a first direction from the prop; and
a guide portion which defines a drop space together with the support,
wherein a drop test is performed through the drop space,
wherein an opening is defined in the guide portion, and the guide portion comprises a first side portion, a first front portion, a second side portion, and a second front portion,
the first front portion is connected with the support by the first side portion, and
the second front portion is connected with the support by the second side portion.

2. The window drop test apparatus of claim 1, wherein gradations are provided in the second front portion and determine a height.

3. The window drop test apparatus of claim 1, wherein a length of the first front portion and a length of the second front portion are shorter than a height of the support such that the drop space is not defined in a predetermined area which is adjacent to the prop.

4. The window drop test apparatus of claim 1, wherein at least one of a groove and a rail is provided in the support, and
the second side portion and the second front portion are movable in a second direction perpendicular to the first direction along the at least one of the groove and the rail provided in the support and change a width of the drop space.

5. The window drop test apparatus of claim 4, further comprising a fixing device which fixes the second side portion and the second front portion after the second side portion and the second front portion are moved.

6. The window drop test apparatus of claim 1, wherein the support comprises a first support and a second support,
the first support, the first side portion, and the first front portion are fixed, and the second support, the second side portion, and the second front portion are movable in a second direction perpendicular to the first direction and change a width of the drop space.

7. The window drop test apparatus of claim 1, wherein the first side portion and the second side portion are respectively provided in plural, and thus further comprise additional openings which expose the drop space.

8. The window drop test apparatus of claim 7, wherein a plurality of first and second side portions has a structure in which a length is adjustable.

9. The window drop test apparatus of claim 1, further comprising a window structure which is inserted into the drop space and then dropped,
wherein the window structure comprises a window and a weight portion which is attached to one side of the window.

10. The window drop test apparatus of claim 9, wherein the window is a three-dimensional window, and
the three-dimensional window comprises a front surface having a flat surface and side surfaces which are bent toward a rear side at four sides of the front surface.

11. The window drop test apparatus of claim 10, wherein the three-dimensional window has a constant thickness at the front surface and the side surfaces, and the constant thickness ranges from about 500 micrometers to about 800 micrometers.

12. The window drop test apparatus of claim 9, wherein the drop space is larger than a cross-section of the window structure by about 1 millimeter to about 5 millimeters.

13. The window drop test apparatus of claim 1, further comprising sandpaper which is disposed in an upper surface of the prop.

14. A window drop test apparatus comprising:
a prop;
a support protruding in a first direction from the prop;
a guide portion which defines a drop space together with the support, and
a window structure which is inserted into the drop space and then dropped, wherein a drop test is performed through the drop space,
wherein an opening is defined in the guide portion,
wherein the window structure comprises a window and a weight portion which is attached to one side of the window,
wherein the window is a three-dimensional window,
wherein the three-dimensional window comprises a front surface having a flat surface and side surfaces which are bent toward a rear side at four sides of the front surface, and
wherein a rear groove is defined at the rear side of the three-dimensional window, and the weight portion is disposed inside the rear groove.

15. The window drop test apparatus of claim 14, wherein the rear groove is larger than the weight portion such that a gap is defined between a side surface of the side surfaces and the weight portion of the three-dimensional window.

16. A window drop test apparatus comprising:
a prop;
a support protruding in a first direction from the prop;
a guide portion which defines a drop space together with the support, wherein an opening is defined in the guide portion,
a window structure which is inserted into the drop space and then dropped, and
a fixing device which is inserted into the drop space through the opening and supports the window structure,
wherein a drop test is performed through the drop space, and
wherein the window structure comprises a window and a weight portion which is attached to one side of the window.

17. The window drop test apparatus of claim 16, wherein the fixing device comprises a handle and an alignment table which is connected to a rear side of the handle and has a flat upper surface.

18. The window drop test apparatus of claim 17, wherein the fixing device further comprises an angle provider which is attached to the alignment table and provides angles to the window structure.

* * * * *